(12) United States Patent
Kliewer et al.

(10) Patent No.: US 11,416,616 B2
(45) Date of Patent: Aug. 16, 2022

(54) SECURE BOOT CHAIN FOR LIVE BOOT SYSTEMS

(71) Applicant: Forcepoint LLC, Austin, TX (US)

(72) Inventors: Robert W. Kliewer, Wylie, TX (US);
Micky S. Martin, Rowlett, TX (US);
Mickey J. Malone, II, Rowlett, TX (US)

(73) Assignee: FORCEPOINT LLC, Austin, TX (US)

( * ) Notice: Subject to any disclaimer, the term of this patent is extended or adjusted under 35 U.S.C. 154(b) by 336 days.

(21) Appl. No.: 15/827,509

(22) Filed: Nov. 30, 2017

(65) Prior Publication Data

US 2019/0163911 A1    May 30, 2019

(51) Int. Cl.

| G06F 21/57 | (2013.01) |
| H04L 9/30 | (2006.01) |
| G06F 9/54 | (2006.01) |
| G06F 9/4401 | (2018.01) |

(52) U.S. Cl.
CPC .......... *G06F 21/575* (2013.01); *G06F 9/4401* (2013.01); *G06F 9/4406* (2013.01); *G06F 9/545* (2013.01); *H04L 9/30* (2013.01)

(58) Field of Classification Search
CPC ...... G06F 21/575; G06F 9/4406; G06F 9/545; H04L 9/30
See application file for complete search history.

(56) References Cited

U.S. PATENT DOCUMENTS

| 5,892,900 | A | 4/1999 | Ginter et al. |
| 6,898,709 | B1 | 5/2005 | Teppler |
| 7,194,543 | B2 | 3/2007 | Robertson et al. |
| 7,340,693 | B2 | 3/2008 | Martin et al. |
| 8,868,914 | B2 | 10/2014 | Teppler |
| 9,742,866 | B2 | 8/2017 | Shribman et al. |
| 10,592,669 | B2 * | 3/2020 | Gunti ................... G06F 21/575 |
| 2003/0061409 | A1 | 3/2003 | RuDusky |
| 2003/0066057 | A1 | 4/2003 | RuDusky |

(Continued)

FOREIGN PATENT DOCUMENTS

| CA | 2619141 | 10/2014 |
| JP | 5342649 | 11/2013 |

*Primary Examiner* — Matthew Smithers
*Assistant Examiner* — Shu Chun Gao
(74) *Attorney, Agent, or Firm* — Jackson Walker LLP; Christopher J. Rourk

(57) ABSTRACT

A system is provided for managing booting of an OS that includes a UEFI controller comprising embedded application code instructions and a pre-loaded signed certificate, a boot process controller comprising application code instructions for the OS, pre-loaded signed certificates, and a plurality of application hash identifiers. The boot process controller receives signed communications from the UEFI controller and determines if the UEFI controller is authorized to manage the OS. The UEFI controller manages the OS in response to a positive authorization. The boot process controller determines if the UEFI controller is authorized to manage the OS in response to installation or execution of the OS. The UEFI controller receives a signed communication from the boot loader program, compares the signed communications with the plurality of application identifiers, and executes the boot loader program in response to the pre-loaded signed certificate matching an application identifier from the plurality.

20 Claims, 2 Drawing Sheets

(56) References Cited

U.S. PATENT DOCUMENTS

| | | | | |
|---|---|---|---|---|
| 2009/0327741 | A1* | 12/2009 | Zimmer | G06F 21/575 |
| | | | | 713/183 |
| 2018/0247059 | A1* | 8/2018 | Nara | G06F 21/6218 |
| 2018/0314831 | A1* | 11/2018 | Liu | H04L 9/30 |
| 2018/0349608 | A1* | 12/2018 | de Cesare | G06F 21/575 |
| 2018/0365424 | A1* | 12/2018 | Callaghan | G06F 21/575 |

* cited by examiner

SECURE BOOT CHAIN FOR LIVE BOOT SYSTEMS

TECHNICAL FIELD

The present disclosure relates generally to installing and booting an Operating System (OS) and, more specifically, to secure systems and methods for securely installing and booting an OS.

BACKGROUND

Cross domain transfers offer numerous avenues for malicious entities to attack a data processing system. An application service provider will often allow applications that have not been provided by the application service provider to be used, and will also frequently allow such applications to execute on hardware that can be compromised. When the service applications can be compromised, or the hardware on which those applications can be compromised, or the operating network environment can be compromised, a malicious entity can obtain access to the hardware and/or network, and can either steal confidential data, corrupt stored data or otherwise compromise data and applications.

SUMMARY

In an embodiment, the present disclosure is directed to a system for managing booting of an operating system. The system can include a UEFI controller that uses embedded application code instructions and a pre-loaded signed certificate. A boot process controller can be provided that includes application code instructions for the operating system, pre-loaded signed certificates, and a plurality of application hash identifiers, where the boot process controller receives signed communications from the UEFI controller and determines if the UEFI controller is authorized to functionally manage the operating system. The UEFI controller can manage the operating system in response to a positive authorization, and the operating system can include a boot loader program, an initial RAM file system, kernel image, a base OS image, configuration image files, and pre-signed certificates associated with each.

In another embodiment, the UEFI controller and the boot process controller exchange public keys using a Key Exchange Server (KES) and a Key Exchange Client (KEC). The boot process controller can further determine if the UEFI controller is authorized to functionally manage the operating system in response to installation of the operating system. The boot process controller can also determine if the UEFI controller is authorized to functionally manage the operating system in response to booting of the operating system.

In yet another embodiment, the UEFI controller reads the signature from the boot loader program and compares the signature with the plurality of application hash identifiers. The UEFI controller executes the boot loader program in response to the pre-loaded signed certificate matching an application hash identifier from the plurality of application hash identifiers.

In another embodiment, the boot loader program receives pre-loaded signatures of the kernel image and initial RAM file system and compares the pre-loaded signatures of the kernel image and initial RAM file system with the plurality of application hash identifiers. The boot loader program executes the kernel image with the initial RAM file system in response to the pre-loaded signatures matching an application hash identifier from the plurality of application hash identifiers.

In still another embodiment, the initial RAM file system can read signatures from the base OS image and configuration image files and compare the signatures with the plurality of application hash identifiers. The initial RAM file system can execute the base OS image with the configuration image in response to the pre-loaded signatures matching an application hash identifier from the plurality of application hash identifiers.

BRIEF DESCRIPTION OF DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

An application service provider needs to ensure that only trusted services applications that have been provided by the application service provider are being used, and that they execute only on hardware recognized as secure. Application service providers need to further ensure that the trusted service applications executing on the secure hardware only execute within the trusted environment, and they must prevent other untrusted application services from executing within the trusted environment even when a malicious entity has physical access to the hardware and/or network associated with the trusted environment. The present disclosure provides a trusted execution environment with stringent controls to control how the environment can be operationally controlled and managed.

Figure 1:
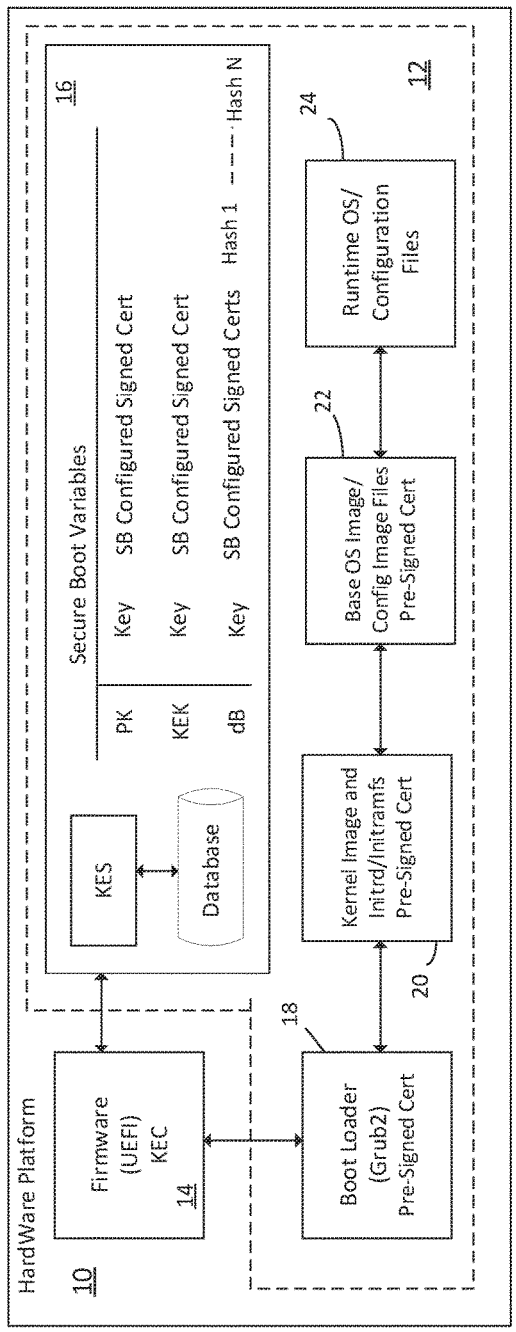
FIG. 1 is a block diagram of a hardware and firmware computer platform 10 and an installable and bootable OS 12, in accordance to certain example embodiments.

Referring to FIG. 1, illustrated is a block diagram of a hardware and firmware computer platform 10 and an installable and bootable OS 12, according to certain example embodiments. The platform 10 includes a Unified Extensible Firmware Interface (UEFI) controller 14 for bootstrapping the system 12 when installing and booting the system 12. The UEFI controller 14 can include a Key Exchange Client (KEC), pre-installed, e.g., during manufacture of the platform 10. The UEFI controller 14 can support the Secure Boot (SB) systems application standard. System 12 can comprise a boot process controller 16, a bootloader program 18, a kernel image and an initrd or initramfs 20, a base OS image and configuration image 22, and runtime OS and configuration files 24. It should be understood that depending on user preference, the boot process controller 16, the bootloader program 18, the initrd or initramfs 20, and the kernel image and configuration files 22 can be local to the system 12 or stored remotely accessible over a network connection. The boot process controller 16 also can include a database and a Key Exchange Server (KES) for securely exchanging keys with the KEC.

Private keys and self-signed certificates are generated and associated with the following SB variables: PK (Platform Key); KEK (Key Exchange Key); and db (signature database). In addition, the certificates can be configured in a manner suitable to the SB system. I.e., the public key, signature, and random data are arranged in a manner required by the SB standard. A whitelist of third party applications, UEFI drivers, typically SAS/RAID drivers, NIC drivers, and Lights Out Management needed to run on the approved platform 10 can also be included. Hashes of the approved drivers are added to the SB dB variable. These keys and certifications can be used to authenticate the use of the UEFI controller 14, bootloader program 18, initrd or initramfs 20, kernel image and configuration files 22, and runtime OS and configuration files 24. It should also be understood that the keys and certificates can be preinstalled into their respective components during manufacture. For example, the UEFI controller can have its certificate installed during the hardware platform 10 manufacture and the keys and certificates of system 12 installed during its manufacture. The keys and certificates are stored in a encrypted, e.g. gpg2, tarball when at rest. Unencrypted private keys only exist on a ram file system (/dev/shm) for the duration of the current operation, then are securely deleted.

Once the certificates are installed in the SB variables, the system 12 only executes applications, including the UEFI controller 14 (with UEFI drivers that are either signed by the db private key or have a matching hash in the dB variable), boot loader controller 18, kernel image and initrd (or initramfs 20), a base OS image and configuration image 22, and runtime OS and configuration files 24. The GNU Privacy Guard (GPG2) command, e.g., can be used to create the public/private key pair for boot loader program 18. The boot loader program 18, e.g. Grub, can be built so the public key, configuration, and all needed modules are included in the image. The configuration secures the boot loader program 18 so that only predefined boot targets can execute. For example, the configuration can prevent a user from getting a grub command line or edit a boot target. Just before boot loader program 18 loads the kernel and initial ramdisk 20, the UEFI function ExitBootServices( ) is called. Among other things, this function causes the UEFI controller 14 to no longer use Secure Boot for code verification. Instead, a public key signature checking feature of Grub can be used to load the kernel and initial ramdisk. With signature checking enabled, Grub will not read any file that does not have a matching signature file that is valid against the public key, with the exception of the bootopt file. The kernel and initial ramdisk 22 are signed with the private key so that boot loader program 18 can load them. The bootopt file contains lists of variables and only the ones that are in our whitelist are read.

Once the boot loader 18 boots the kernel with the custom initial ramdisk 20, the initial ramdisk 20 runs through the system startup before the real root filesystem is loaded. Keys and self-signed certs are created for the following: a system key, a Sysadmin CA, and a Secadmin CA. This can be done during manufacture of system 12 or during installation. The initial ramdisk 20 contains the certificates for these three keys. The base OS image 22 forms the foundation of the root file system on the system 12. This is analogous to a system image of a live boot linux distro. The base OS image 22 is built and signed in factory with the system key. The initial ramdisk can read the base image from a location provided on the kernel command line and verify that the image 22 is signed with the system key. Once the base image is verified it is extracted to the new root directory.

The initrd/initramfs 20 provides supplementary configuration files and in some cases replacement files for the base image. Configurations for system 12 can be created on the administration system of system 12. The administration system creates deployment specific key/certificate pairs for Sysadmin and Secadmin during installation. These certificates can be signed by their respective CAs and securely stored in the database. The database can be, e.g., an LDAP database. Once a configuration is created it must be signed by two users, one in the sysadmin (system admin) role and one in the secadmin (security admin) role, using a custom signing tool, which links openssl and uses the appropriate deployment key. The doubly signed config image may now be installed on system 12.

The config image 22 contains multiple files: the actual configuration, signer specific metadata files (containing things such as the signer's user name, timestamp of the signature, and hash of the configuration), signatures of the metadata files, and the deployment certs. The initial ramdisk verifies that the deployments certificates are signed by their respective CAs, uses the certificates and the signatures to verify the metadata files, and uses the hashes within the metadata files to verify the configuration. Once the configuration is verified it is rendered to the new root directory.

Virus definitions exist in their own signed image separate from the base image because they receive updates daily and customers require updates more frequently than are typically released. System 12 ships with virus definitions (current as of release time) signed with the system key. Virus definitions are updated by two users signing newer definitions, one in the sysadmin role and one in the secadmin role similar to the way configurations are signed. Virus definitions are verified using the appropriate verification scheme (system key or sysadmin/secadmin verify) and then extracted the new root directory.

Once the base and config image 22 and virus definitions are all extracted/rendered to the new root directory, some final preparations are made which include running the aide command to initialize the file system integrity database of the new root filesystem. The initial ramdisk 20 then calls switch_root to load the new root filesystem and transition out of the initial ramdisk 20 and into the runtime OS 24 of the system 12.

While system 12 is up and running, periodic filesystem integrity checks (via the aide command) and virus scans are performed to ensure no tampering. OS hardening and selinux policy ensure that the system can only be changed via a configuration update and system reboot. Anytime the system reboots, it goes through the same signature checks during the boot process to ensure the system comes up "factory fresh". When a network booted system 12 powers off, no data persists on the system and it can essentially go from classified while running to unclassified at power off.

Figure 2:
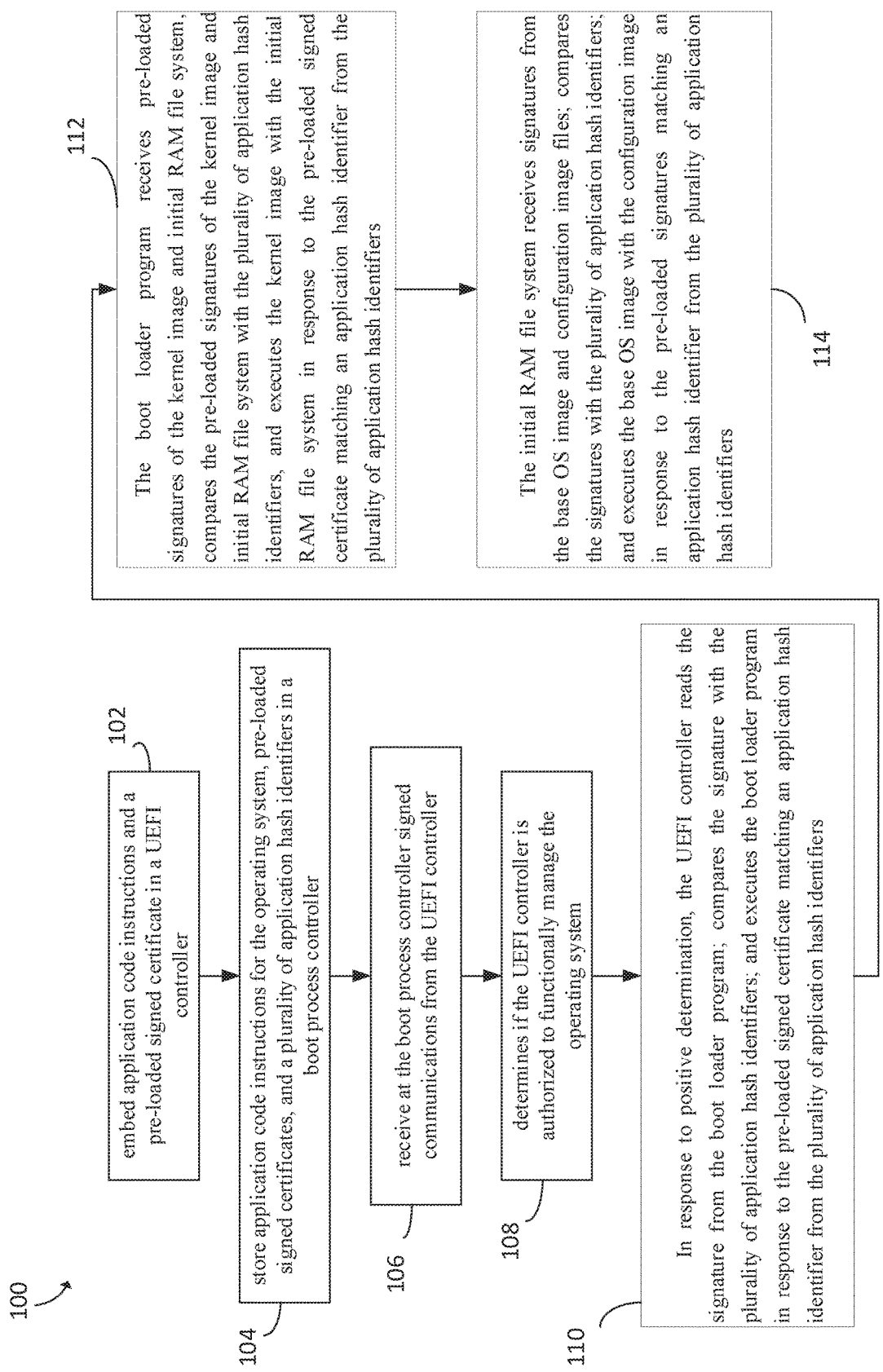
FIG. 2 is a flow diagram of an algorithm for managing booting of an operating system, in accordance to certain example embodiments, in accordance with certain example embodiments.

FIG. 2 is a flow diagram of an algorithm for managing booting of an operating system, according to certain example embodiments, denoted generally as 100. The algorithm 100 begins at block 102 wherein application code instructions and a pre-loaded signed certificate are embedded in the UEFI controller 14. The algorithm 100 continues at block 104 wherein the algorithm 100 stores application code instructions for the operating system, pre-loaded signed certificates, and a plurality of application hash identifiers in the boot process controller 16. The algorithm 100 continues at block 106 wherein the algorithm 100 receives at the boot process controller 16 signed communications from the UEFI controller. The algorithm 100 continues at block 108 wherein the boot process controller 16 determines if the UEFI controller 14 is authorized to functionally manage the operating system. The algorithm 100 continues at block 110 wherein the UEFI controller 14 reads the signature from the boot loader program 18, compares the signature with the plurality of application hash identifiers, and executes the boot loader program in response to the pre-loaded signed certificate matching an application hash identifier from the plurality of application hash identifiers. The algorithm 100 continues at block 112 wherein the boot loader program receives pre-loaded signatures of the kernel image and initial RAM file system, compares the pre-loaded signatures of the kernel image and initial RAM file system with the plurality of application hash identifiers, and executes the kernel image with the initial RAM file system in response to the pre-loaded signed certificate matching an application hash identifier from the plurality of application hash identifiers. The algorithm continues at block 114 wherein the initial RAM file system receives signatures from the base OS image and configuration image files, compares the signatures with the plurality of application hash identifiers, and executes the base OS image with the configuration image in response to the pre-loaded signatures matching an application hash identifier from the plurality of application hash identifiers.

Figure 3:
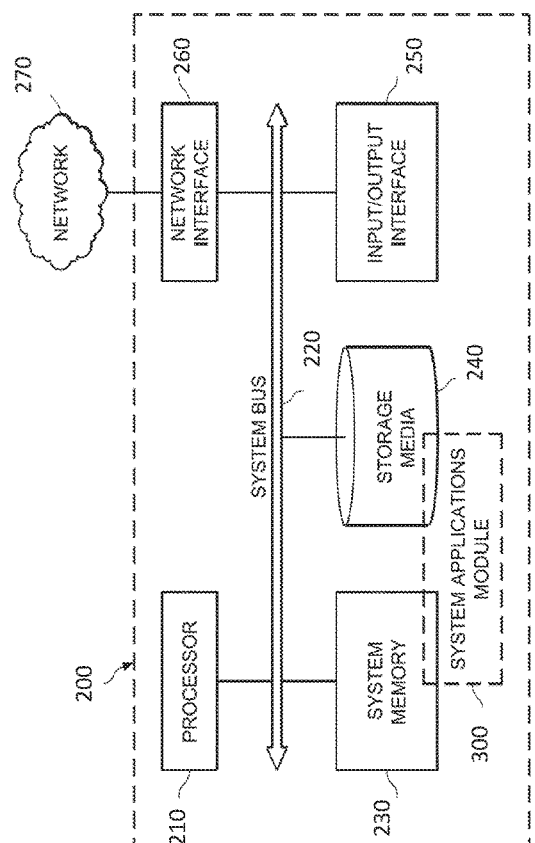
FIG. 3 is a block diagram depicting a computing machine and system applications, in accordance with certain example embodiments.

FIG. 3 is a computing machine 200 and a system applications module 300 in accordance with example embodiments. The computing machine 200 can correspond to any of the various computers, mobile devices, laptop computers, servers, embedded systems, or computing systems presented herein. The module 300 can comprise one or more hardware or software elements designed to facilitate the computing machine 200 in performing the various methods and processing functions presented herein. The computing machine 200 can include various internal or attached components such as a processor 210, system bus 220, system memory 230, storage media 240, input/output interface 250, and a network interface 260 for communicating with a network 270.

The computing machine 200 can be implemented as a conventional computer system, an embedded controller, a laptop, a server, a mobile device, a smartphone, a wearable computer, a customized machine, any other hardware platform, or any combination or multiplicity thereof. The computing machine 200 can be a distributed system configured to function using multiple computing machines interconnected via a data network or bus system.

The processor 210 can be designed to execute code instructions in order to perform the operations and functionality described herein, manage request flow and address mappings, and to perform calculations and generate commands. The processor 210 can be configured to monitor and control the operation of the components in the computing machine 200. The processor 210 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. The processor 210 can be a single processing unit, multiple processing units, a single processing core, multiple processing cores, special purpose processing cores, co-processors, or any combination thereof. According to certain embodiments, the processor 210 along with other components of the computing machine 200 can be a virtualized computing machine executing within one or more other computing machines.

The system memory 230 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 230 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 230. The system memory 230 can be implemented using a single memory module or multiple memory modules. While the system memory 230 is depicted as being part of the computing machine 200, one skilled in the art will recognize that the system memory 230 can be separate from the computing machine 200 without departing from the scope of the subject technology. It should also be appreciated that the system memory 230 can include, or operate in conjunction with, a non-volatile storage device such as the storage media 240.

The storage media 240 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 240 can store one or more operating systems, application programs and program modules such as module 300, data, or any other information. The storage media 240 can be part of, or connected to, the computing machine 200. The storage media 240 can also be part of one or more other computing machines that are in communication with the computing machine 200 such as servers, database servers, cloud storage, network attached storage, and so forth.

The system applications module 300 can comprise one or more hardware or software elements configured to facilitate the computing machine 200 with performing the various methods and processing functions presented herein. The module 300 can include one or more sequences of instructions stored as software or firmware in association with the system memory 230, the storage media 240, or both. The storage media 240 can therefore represent examples of machine or computer readable media on which instructions or code can be stored for execution by the processor 210. Machine or computer readable media can generally refer to any medium or media used to provide instructions to the processor 210. Such machine or computer readable media associated with the module 300 can comprise a computer software product. It should be appreciated that a computer software product comprising the module 300 can also be associated with one or more processes or methods for delivering the module 300 to the computing machine 200 via the network 270, any signal-bearing medium, or any other communication or delivery technology. The module 300 can also comprise hardware circuits or information for configuring hardware circuits such as microcode or configuration information for an FPGA or other PLD.

The input/output ("I/O") interface 250 can be configured to couple to one or more external devices, to receive data from the one or more external devices, and to send data to the one or more external devices. Such external devices along with the various internal devices can also be known as peripheral devices. The I/O interface 250 can include both electrical and physical connections for coupling the various peripheral devices to the computing machine 200 or the processor 210. The I/O interface 250 can be configured to communicate data, addresses, and control signals between the peripheral devices, the computing machine 200, or the processor 210. The I/O interface 250 can be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 250 can be configured to implement only one interface or bus technology. Alternatively, the I/O interface 250 can be configured to implement multiple interfaces or bus technologies. The I/O interface 250 can be configured as part of, all of, or to operate in conjunction with, the system bus 220. The I/O interface 250 can include one or more buffers for buffering transmissions between one or more external devices, internal devices, the computing machine 200, or the processor 210.

The I/O interface 250 can couple the computing machine 200 to various input devices including mice, touch-screens, scanners, electronic digitizers, sensors, receivers, touchpads, trackballs, cameras, microphones, keyboards, any other pointing devices, or any combinations thereof. The I/O interface 250 can couple the computing machine 200 to various output devices including video displays, speakers, printers, projectors, tactile feedback devices, automation control, robotic components, actuators, motors, fans, solenoids, valves, pumps, transmitters, signal emitters, lights, and so forth.

The computing machine 200 can operate in a networked environment using logical connections through the network interface 260 to one or more other systems or computing machines across the network 270. The network 270 can include wide area networks (WAN), local area networks (LAN), intranets, the Internet, wireless access networks, wired networks, mobile networks, telephone networks, optical networks, or combinations thereof. The network 270 can be packet switched, circuit switched, of any topology, and can use any communication protocol. Communication links within the network 270 can involve various digital or an analog communication media such as fiber optic cables, free-space optics, waveguides, electrical conductors, wireless links, antennas, radio-frequency communications, and so forth.

The processor 210 can be connected to the other elements of the computing machine 200 or the various peripherals discussed herein through the system bus 220. It should be appreciated that the system bus 220 can be within the processor 210, outside the processor 210, or both. According to some embodiments, any of the processor 210, the other elements of the computing machine 200, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A system for managing booting of an operating system, the system comprising:
    a Unified Extensible Firmware Interface (UEFI) controller 14 operating on a hardware processor and comprising embedded application code instructions;
    a boot process controller operating on the processor comprising application code instructions for the operating system, a pre-loaded signed platform key, key exchange key and a signature database, and a plurality of application hash identifiers, and
    the boot process controller receives signed communications from the UEFI controller and determines if the UEFI controller is authorized to functionally manage the operating system by comparing the signed communications to one of the pre-loaded signed platform key, key exchange key and a signature database for a boot loader;
    wherein the boot process controller further compares the signed communications to one of the pre-loaded signed platform key, key exchange key and a signature database for a kernel image;
    wherein the boot process controller further compares the signed communications to one of the pre-loaded signed platform key, key exchange key and a signature database for an operating system image;
    wherein the boot processor controller allows the UEFI controller to control the operating system in response to a positive authorization for the boot loader, the kernel image and the operating system image;
    wherein the operating system comprises a boot loader program, an initial RAM file system, the kernel image, configuration image files, and pre-signed certificates associated with each.

2. The system of claim 1 wherein the UEFI controller and the boot process controller exchange public keys using a Key Exchange Server (KES) and a Key Exchange Client (KEC).

3. The system of claim 1 wherein the boot process controller determines if the UEFI controller is authorized to access the operating system in response to installation of the operating system.

4. The system of claim 1 wherein the boot process controller determines if the UEFI controller is authorized to control the operating system in response to execution of the operating system.

5. The system of claim 1 wherein the UEFI controller:
reads the signature from the boot loader program;
compares the signature with the plurality of application hash identifiers; and
executes the boot loader program in response to the signature matching an application hash identifier from the plurality of application hash identifiers.

6. The system of claim 5 wherein the boot loader program:
receives pre-loaded signatures of the kernel image and initial RAM file system;
compares the pre-loaded signatures of the kernel image and initial RAM file system with the plurality of application hash identifiers; and
executes the kernel image with the initial RAM file system in response to the pre-loaded signature matching an application hash identifier from the plurality of application hash identifiers.

7. The system of claim 6 wherein the initial RAM file system:
reads signatures from the base OS image and configuration image files;
compares the signatures with the plurality of application hash identifiers; and
executes the base OS image with the configuration image in response to the signatures matching an application hash identifier from the plurality of application hash identifiers.

8. A method for managing booting of an operating system, the method comprising:
embedding application code instructions and a plurality of pre-loaded signed platform key, key exchange key and a signature database in a Unified Extensible Firmware Interface (UEFI) controller;
storing application code instructions for the operating system, the pre-loaded signed platform key, key exchange key and a signature database, and a plurality of application hash identifiers in a boot process controller,
receiving at the boot process controller signed communications from the UEFI controller; and
determining if the UEFI controller is authorized to functionally manage the operating system by comparing the boot process controller signed communications to one of the pre-loaded signed platform key, key exchange key and a signature database for a boot loader, one of the pre-loaded signed platform key, key exchange key and a signature database for a kernel image and one of the pre-loaded signed platform key, key exchange key and a signature database for an operating system image;
wherein the UEFI controller functionally manages the operating system in response to a positive authorization for the boot loader, the kernel image and the operating system image;
wherein the operating system comprises a boot loader program, the kernel image and an initial RAM file system, base OS image and configuration image files, and pre-signed certificates associated with each.

9. The method of claim 8 further comprising the UEFI controller and the boot process controller exchanging public keys using a Key Exchange Server (KES) and Key Exchange Client (KEC).

10. The method of claim 8 further comprising the boot process controller determining if the UEFI controller is authorized to functionally manage the operating system in response to installation of the operating system.

11. The method of claim 8 further comprising the boot process controller determining if the UEFI controller is authorized to functionally manage the operating system in response to execution of the operating system.

12. The method of claim 8 further comprising the UEFI controller:
reading the signature from the boot loader program;
comparing the signature with the plurality of application hash identifiers; and
executing the boot loader program in response to the signature matching an application hash identifier from the plurality of application hash identifiers.

13. The method of claim 12 further comprising the boot loader program:
receiving pre-loaded signatures of the kernel image and initial RAM file system;
comparing the pre-loaded signatures of the kernel image and initial RAM file system with the plurality of application hash identifiers; and
executing the kernel image with the initial RAM file system in response to the pre-loaded signatures matching an application hash identifier from the plurality of application hash identifiers.

14. The method of claim 13 further comprising the initial RAM file system:
reading signatures from the base OS image and configuration image files;
comparing the signatures with the plurality of application hash identifiers; and
executing the base OS image with the configuration image in response to the signatures matching an application hash identifier from the plurality of application hash identifiers.

15. An apparatus for managing booting of an operating system, the apparatus comprising:
a Unified Extensible Firmware Interface (UEFI) controller operating on a hardware processor and comprising embedded application code instructions and a pre-loaded signed certificate;
a boot process controller comprising application code instructions for the operating system, pre-loaded signed platform key, key exchange key and a signature database, and a plurality of application hash identifiers, and
the boot process controller receives signed communications from the UEFI controller and determines if the UEFI controller is authorized to functionally manage the operating system by comparing the signed communications to one of the pre-loaded signed platform key, key exchange key and a signature database for a boot loader;
wherein the UEFI controller functionally manages the operating system in response to a positive authorization for the boot loader, the kernel image and the operating system image;
wherein the operating system comprises a boot loader program, an initial RAM file system, the kernel image, configuration image files, and pre-signed certificates associated with each.

16. The apparatus of claim 15 wherein the boot process controller determines if the UEFI controller is authorized to functionally manage the operating system in response to installation of the operating system.

17. The apparatus of claim 15 wherein the boot process controller determines if the UEFI controller is authorized to functionally manage the operating system in response to execution of the operating system.

18. The apparatus of claim 15 wherein the UEFI controller:
   reads the signature from the boot loader program;
   compares the signature with the plurality of application hash identifiers; and
   executes the boot loader program in response to the signature matching an application hash identifier from the plurality of application hash identifiers.

19. The apparatus of claim 18 wherein the boot loader program:
   receives pre-loaded signatures of the kernel image and initial RAM file system;
   compares the pre-loaded signatures of the kernel image and initial RAM file system with the plurality of application hash identifiers; and
   executes the kernel image with the initial RAM file system in response to the pre-loaded signatures matching an application hash identifier from the plurality of application hash identifiers.

20. The apparatus of claim 19 wherein the initial RAM file system:
   reads a signatures from the base OS image and configuration image files;
   compares the signatures with the plurality of application hash identifiers; and
   executes the base OS image with the configuration image in response to the signatures matching an application hash identifier from the plurality of application hash identifiers.

* * * * *